(12) United States Patent
Jose et al.

(10) Patent No.: US 10,331,526 B2
(45) Date of Patent: Jun. 25, 2019

(54) SYSTEMS, METHODS, AND APPARATUS FOR FREQUENCY RESET OF A MEMORY

(71) Applicant: QUALCOMM Incorporated, San Diego, CA (US)

(72) Inventors: Edwin Jose, San Diego, CA (US); Tao Wang, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 174 days.

(21) Appl. No.: 15/170,742

(22) Filed: Jun. 1, 2016

(65) Prior Publication Data

US 2017/0031785 A1 Feb. 2, 2017

Related U.S. Application Data

(60) Provisional application No. 62/199,639, filed on Jul. 31, 2015.

(51) Int. Cl.
  *G06F 11/14* (2006.01)
  *G06F 3/06* (2006.01)
  *G06F 13/16* (2006.01)

(52) U.S. Cl.
  CPC ........ *G06F 11/1471* (2013.01); *G06F 3/0619* (2013.01); *G06F 3/0632* (2013.01); *G06F 3/0679* (2013.01); *G06F 13/1668* (2013.01); *G06F 2201/805* (2013.01); *G06F 2201/84* (2013.01); *G06F 2201/85* (2013.01)

(58) Field of Classification Search
  USPC ........................................................ 714/19
  See application file for complete search history.

(56) References Cited

U.S. PATENT DOCUMENTS

| 5,229,970 A | * | 7/1993 | Lee | G11C 11/406 365/194 |
| 5,446,695 A | * | 8/1995 | Douse | G11C 11/406 365/222 |
| 6,002,629 A | * | 12/1999 | Kim | G11C 11/4087 365/222 |

(Continued)

OTHER PUBLICATIONS

International Search Report and Written Opinion—PCT/US2016/035520—ISA/EPO—dated Aug. 12, 2016.

(Continued)

*Primary Examiner* — Kamini B Patel
(74) *Attorney, Agent, or Firm* — Muncy, Geissler, Olds & Lowe, P.C.

(57) ABSTRACT

Some aspects of the disclosure include a self-refresh entry sequence for a memory, such as a DRAM, that may be used to avoid a frequency mismatch between a system processor and a system memory. The self-refresh entry sequence may signal the memory to reset the frequency set point state and default to the power-up state upon a self-refresh process exit. In another aspect, a new mode register may be used to indicate that the frequency set point needs to be reset after the next self-refresh entry command. In this aspect, the processor will execute a mode register write command followed by a self-refresh entry in response to the occurrence of a crash event. Then, the memory will reset to the default frequency set point by the end of self-refresh entry execution.

20 Claims, 8 Drawing Sheets

(56) References Cited

U.S. PATENT DOCUMENTS

| | | | | |
|---|---|---|---|---|
| 2005/0265103 | A1* | 12/2005 | Remaklus, Jr. | G11C 11/406 365/222 |
| 2006/0187226 | A1* | 8/2006 | Bruno | G06F 1/3203 345/534 |
| 2007/0041264 | A1* | 2/2007 | Cohen | G06F 13/1689 365/233.1 |
| 2007/0097677 | A1* | 5/2007 | Oh | G11C 7/04 362/222 |
| 2008/0159335 | A1* | 7/2008 | Subashchandrabose | G06F 1/04 370/480 |
| 2009/0019323 | A1* | 1/2009 | Porterfield | G06F 13/4243 714/700 |
| 2009/0249169 | A1* | 10/2009 | Bains | G06F 11/106 714/766 |
| 2010/0007770 | A1* | 1/2010 | Koganezawa | G06F 13/1689 348/231.99 |
| 2013/0166832 | A1* | 6/2013 | Peng | G06F 13/1689 711/103 |
| 2014/0244914 | A1* | 8/2014 | Tzeng | G06F 12/0246 711/103 |
| 2015/0085594 | A1* | 3/2015 | Dong | G11C 11/40626 365/222 |
| 2015/0162068 | A1* | 6/2015 | Woo | G11C 11/40615 365/222 |

OTHER PUBLICATIONS

JEDEC: "JEDEC Standard DDR4 SDRAM JESD79-4," Sep. 30, 2012 (Sep. 30, 2012), XP055293197, Arlington, VA Retrieved from the Internet: URL:http://www.softnology.biz/pdf/JESD79-4_DDR4_SDRAM.pdf.

Song K., et al., "A 1.1V 2y-nm 4.35Gb/s/pin 8Gb LPDDR4 Mobile Device with Bandwidth Improvement Techniques," Proceedings of the IEEE 2014 Custom Integrated Circuits Conference, IEEE, Sep. 15, 2014 (Sep. 15, 2014), pp. 1-4, XP032676325, DOI: 10.1109/CICC.2014.6946032 [retrieved on Nov. 4, 2014].

JEDEC Standard: "Low Power Double Data Rate 4 (LPDDR4)," JESD209-4, Aug. 2014, 196 pages.

\* cited by examiner

| MRxx Register Information (MA[7:0] = 16H) | | | | | | | |
|---|---|---|---|---|---|---|---|
| OP[7] | OP[6] | OP[5] | OP[4] | OP[3] | OP[2] | OP[1] | OP[0] |
| FSP_RST_CONDITION_COUNT | | | | FSP_RST_CONDITION | FSP_WR_RST_VALUE | FSP_OP_RST_VALUE | FSP_RST_EN |

410

| Function | Operand | Data |
|---|---|---|
| FSP_RST_EN | OP[0] | 0: No FSP reset (default)<br>1: FSP reset when reset conditions are met |
| FSP_OP_RST_VALUE | OP[1] | 0: FSP_OP reset to 0 when reset conditions are met (default)<br>1: FSP_OP reset to 1 when reset conditions are met |
| FSP_WR_RST_VALUE | OP[2] | 0: FSP_WR reset to 0 when reset conditions are met (default)<br>1: FSP_WR reset to 1 when reset conditions are met |
| FSP_RST_CONDITION | OP[3] | 0: valid commands after MRxx write before FSP RESET<br>1: clock cycles after MRxx write before FSP RESET |
| FSP_RST_CONDITION_COUNT | OP[4:7] | valid command or clock cycle count depending on OP[3] |

SYSTEMS, METHODS, AND APPARATUS FOR FREQUENCY RESET OF A MEMORY

CROSS-REFERENCE TO RELATED APPLICATIONS

The present Application for Patent claims the benefit of U.S. Provisional Application No. 62/199,639, entitled "SYSTEMS, METHODS, AND APPARATUS FOR FREQUENCY RESET OF A MEMORY," filed Jul. 31, 2015, assigned to the assignee hereof, and expressly incorporated herein by reference in its entirety.

FIELD OF DISCLOSURE

This disclosure relates generally to Double Data Rate (DDR) memory systems, and more specifically, but not exclusively, to Dynamic Random Access Memory (DRAM) DDR systems.

BACKGROUND

High speed DRAM (such as for mobile device applications) uses Frequency Set Points (FSPs) to operate the DRAM IO pins in a wide range of frequencies. Two operating points (FSP0 and FSP1) are offered and System-on-Chip (SoC) can use either one of them based on the frequency of operation to control communication between the SoC and the DRAM through the IO pins. For example, FSP0 may encompass operations from 0 to 1 GHz while FSP1 may encompass operations from 1 GHz to 2 GHz. This enables multiple operating settings with each fine-tuned for a particular band of frequency. Currently, the standard operation of FSPs is guided by the JEDEC JESD209-4 LPDDR4 industry standard. At power-up, the SoC defaults to FSP0 that has the default settings to operate in unterminated, low frequency environments. A specific FSP switch sequence is required to transfer between the FSPs during a clock frequency switch.

In a multi core processor system that uses DRAM as the system memory, DRAM is often used to store crash logs in an event of a catastrophic event that causes the system to shut down. These events are typically triggered by an expired watchdog timer (hardware or software based) in the system or a manual application of a reset switch. The system needs to flush out the crash log into the DRAM and reset the SoC to later read out the crash log back for further debugging investigations. During this system flush, DRAM is put into a Self-Refresh (SR) state during the SoC reset to maintain the DRAM contents. When the SoC gets reset, it goes into a power-up state at which it thinks the DRAM is at FSP0. The system crash could have happened at any given frequency, thus the DRAM could be at FSP0 or FSP1. This mismatch between SoC and DRAM on the FSP setting will cause the SoC to lose reliable communication with DRAM due to IO setting mismatches (On Die Termination (ODT) signals, driver strength etc.). This mismatch prevents the DRAM from being brought out of self-refresh and resetting the FSP using a mode register write command. In such an event, the crash logs residing in DRAM are lost, which severely impacts debugging and root cause analysis of the system event that caused the crash. JEDEC JESD209-4 LPDDR4 currently does not have a process to address this problem.

Accordingly, there is a need for systems, apparatus, and methods that improve upon conventional approaches including the improved methods, system, and apparatus provided hereby that aid in preventing a FSP mismatch during a reset event.

SUMMARY

The following presents a simplified summary relating to one or more aspects and/or examples associated with the apparatus and methods disclosed herein. As such, the following summary should not be considered an extensive overview relating to all contemplated aspects and/or examples, nor should the following summary be regarded to identify key or critical elements relating to all contemplated aspects and/or examples or to delineate the scope associated with any particular aspect and/or example. Accordingly, the following summary has the sole purpose to present certain concepts relating to one or more aspects and/or examples relating to the apparatus and methods disclosed herein in a simplified form to precede the detailed description presented below.

In one aspect, a method for frequency reset of a first memory comprises: issuing, by a processor, a reset command when the processor is operating at a first frequency set point and the first memory is operating at the first frequency set point; issuing, by the processor, a self-refresh command to the first memory, the self-refresh command including a frequency reset entry; setting the processor at a second frequency set point; issuing, by the processor, a register write command to set the first memory at the second frequency set point; and setting the first memory at the second frequency set point.

In another aspect, a non-transient computer-readable medium containing program instructions for causing a processor to perform a process comprising: issuing a reset command when the processor is operating at a first frequency set point and the first memory is operating at the first frequency set point; issuing a self-refresh command to the first memory, the self-refresh command including a frequency reset entry; setting the processor at a second frequency set point; issuing a register write command to set the first memory at the second frequency set point; and setting the first memory at the second frequency set point.

In still another aspect, a method for checking reset conditions of a first memory comprises: initiating, by a processor, a reset condition check when the processor is operating at a first frequency set point and the first memory is operating at the first frequency set point; counting a number of processor commands received by the first memory since a last reset command; counting a number of clock cycles since the last reset command was received by the first memory; determining if the number of processor commands exceeds a command reset value; determining if the number of clock cycles exceeds a clock reset value; if the number of processor commands exceeds the command reset value or if the number of clock cycles exceeds the clock reset value, issuing, by the processor, a reset command comprising: issuing a self-refresh command to the first memory, the self-refresh command including a frequency reset entry; setting the processor at a second frequency set point; issuing a register write command to set the first memory at the second frequency set point; and setting the first memory at the second frequency set point.

In still another aspect, a non-transient computer-readable medium containing program instructions for causing a processor to perform a process comprising: initiating a reset condition check when the processor is operating at a first frequency set point and the first memory is operating at the first frequency set point; counting a number of processor commands received by the first memory since a last reset command; counting a number of clock cycles since the last reset command was received by the first memory; determining if the number of processor commands exceeds a command reset value; determining if the number of clock cycles exceeds a clock reset value; if the number of processor commands exceeds the command reset value or if the number of clock cycles exceeds the clock reset value, issuing a reset command comprising: issuing a self-refresh command to the first memory, the self-refresh command including a frequency reset entry; setting the processor at a second frequency set point; issuing a register write command to set the first memory at the second frequency set point; and setting the first memory at the second frequency set point.

In still another aspect, a mode register for controlling a frequency set point reset of a first memory comprises: a frequency reset condition count that indicates a frequency reset condition for resetting the first memory; a frequency reset condition that indicates a number of processor commands received by the first memory since a last reset command was received by the first memory or a number of clock cycles that have occurred since the last reset command was received by the first memory; a frequency write reset value that indicates when the frequency reset condition has been met; a frequency reset value that indicates a frequency set point for the first memory; and a frequency reset entry that indicates whether the first memory has reset when the frequency reset condition has been met.

Other features and advantages associated with the apparatus and methods disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which:

FIG. 4 illustrates exemplary mode register entries in accordance with some examples of the disclosure.

Figure 1A:
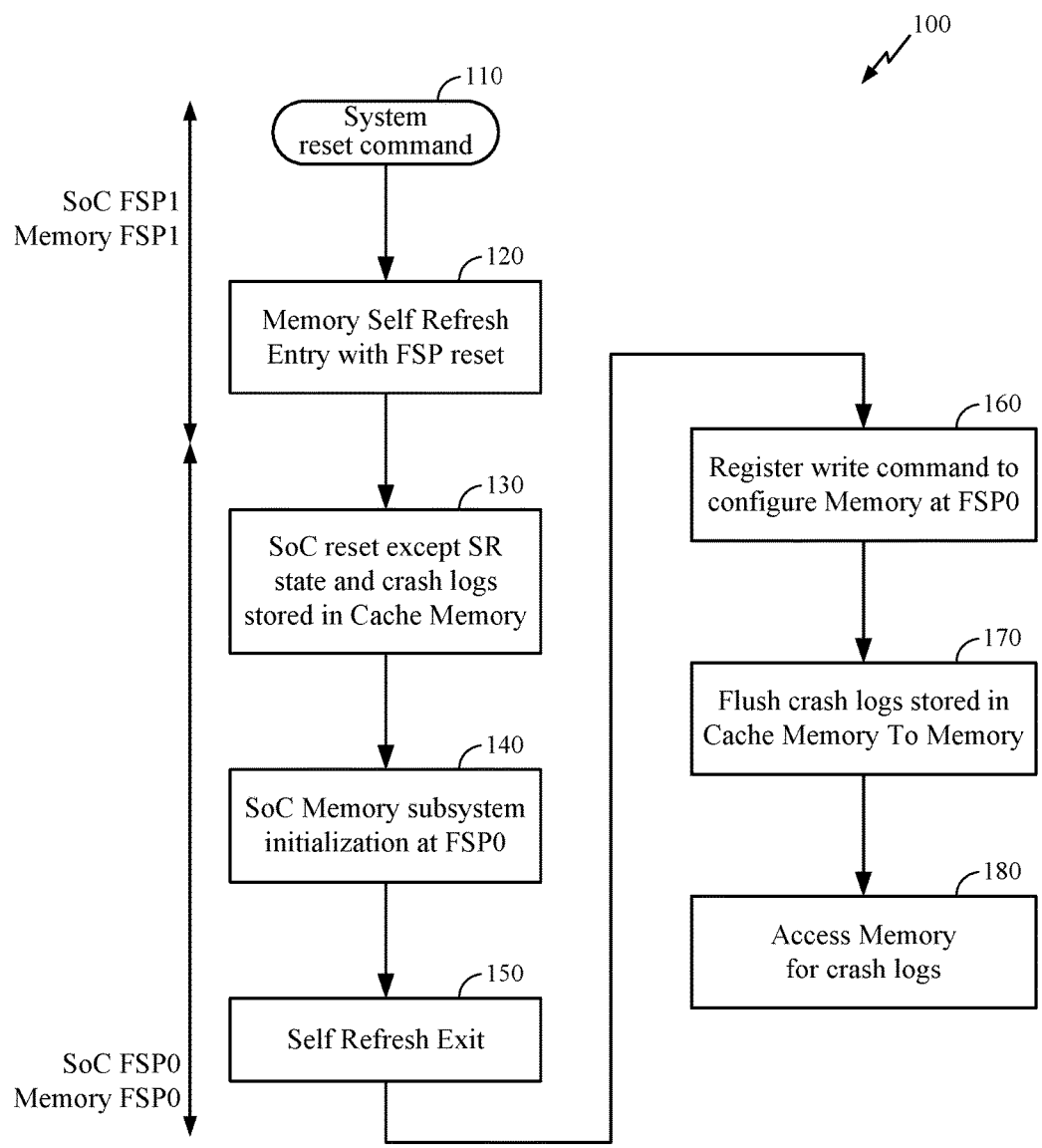
FIG. 1A illustrates an exemplary partial process flow in accordance with some examples of the disclosure.

In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and drawings.

DETAILED DESCRIPTION

The exemplary methods, apparatus, and systems disclosed herein advantageously address the industry needs, as well as other previously unidentified needs, and mitigate shortcomings of the conventional methods, apparatus, and systems. For example, a special Self-Refresh (SR) entry sequence for a DRAM may be used to avoid the aforementioned frequency mismatch. This will signal the DRAM to reset the FSP state and default to the power-up state of FSP0 upon a SR exit process. In one aspect, a new Mode Register (MR) write command may be used to indicate that the FSP needs to be reset after the next SR entry command. In this aspect, the SoC will execute an MR write command followed by an SR entry in response to the occurrence of a crash event. Then, the DRAM will reset to FSP0 by the end of the SR entry execution. In another aspect, a FSP reset request may be encoded in the SR entry command. The DRAM will decode this information and execute the FSP reset at the end of the SR entry execution. In either aspect, the SoC can safely put the DRAM in an SR state and save the contents of the DRAM (particularly the crash logs) upon a crash event. The DRAM may remain in the power-up state of FSP0 during the SR duration. After the SoC reset, the system can safely reset to un-terminated, low frequency IO settings matching the DRAM FSP0 state. The SoC may then execute a SR exit command upon which the DRAM operating settings are at FSP0. Hence FSP states of the SoC and the DRAM will always match. This will avoid losing communication with the DRAM and allow safely reading out the crash log.

Figure 2:
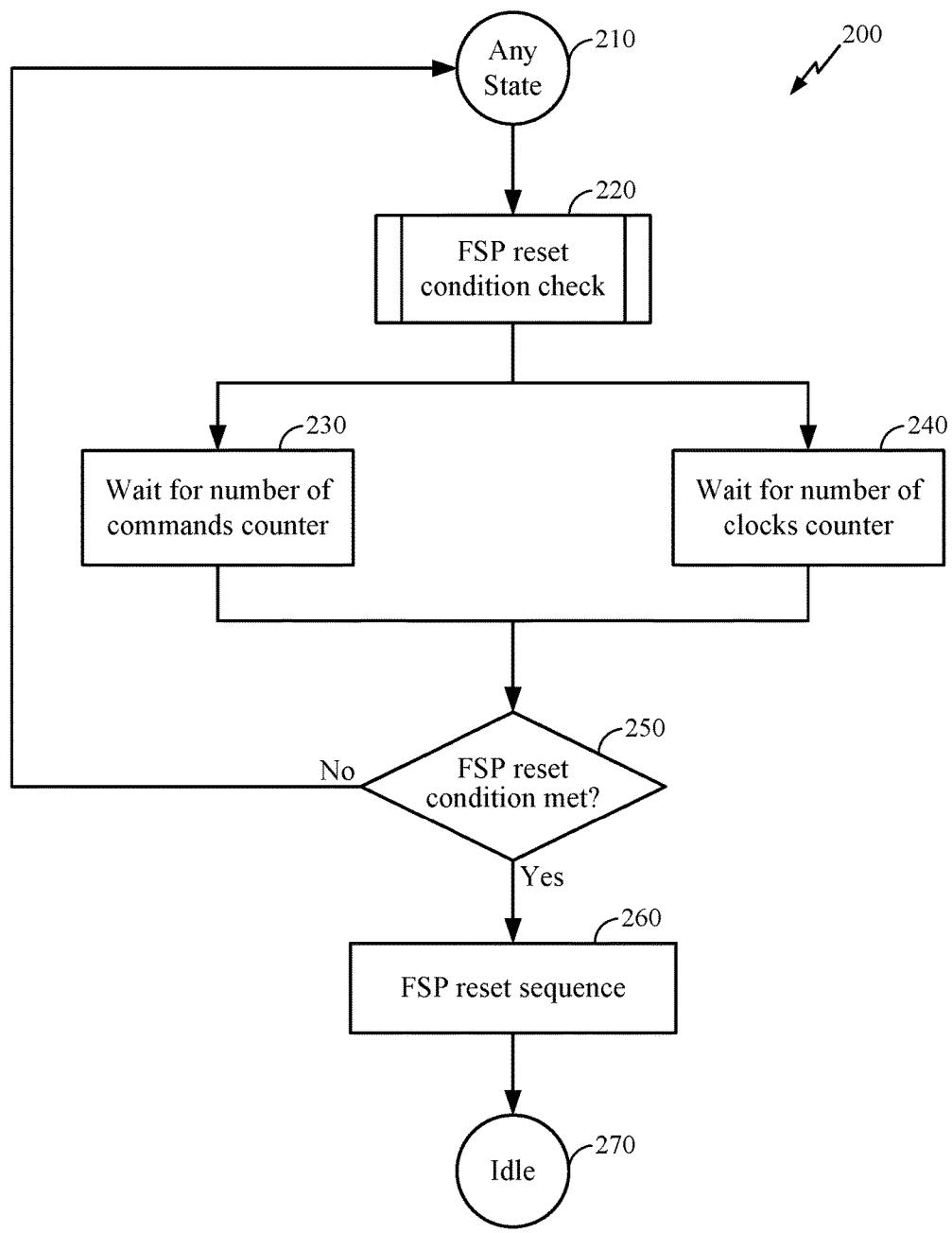
FIG. 2 illustrates another exemplary partial process flow in accordance with some examples of the disclosure.

FIG. 1A illustrates an exemplary partial process flow for resetting an FSP of a memory in accordance with some examples of the disclosure. As shown in FIG. 1A, the partial process 100 begins with a system reset command (block 110) being issued by the system. In this example, the system processor (i.e. SoC) is at a first frequency set point (FSP1) and the system memory (i.e. main memory such as DRAM) is also operating at the first frequency set point (FSP1) at the time the system reset command is issued. In block 120, the system may enter a self-refresh entry in the system reset procedure that includes an FSP reset command for the main memory (see FIG. 4 for an example of the SR entry). In block 130, the SoC may reset except for a SR state entry and the crash logs may be stored in cache memory of the SoC (i.e. L2 cache memory or similar temporary memory that differs from the main memory). In block 140, the SoC memory sub-system may initialize at a second frequency set point (FSP0). In block 150, the SoC will exit the self-refresh portion of the system reset procedure. In block 160, a register write command may be issued to configure the main memory at the second frequency set point (FSP0). This will reset the main memory to FSP0. In block 170, the system will flush or transfer the crash logs from the system cache memory to the main memory. In block 180, the system may access the crash logs now stored in the main memory for debugging or similar routine since both the SoC and the main memory are both operational at FSP0 and there is no frequency mismatch in the IO communications. While only two FSPs are discussed, it should be understood that more than two FSPs may be used by the system. The system reset command may be issued under a number of different conditions besides a manual reset switch being toggled or a system crash resulting in an automatic system reset occurrence. FIG. 2 describes a few examples of other conditions that may require a system reset command to be issued.

Figure 1B:
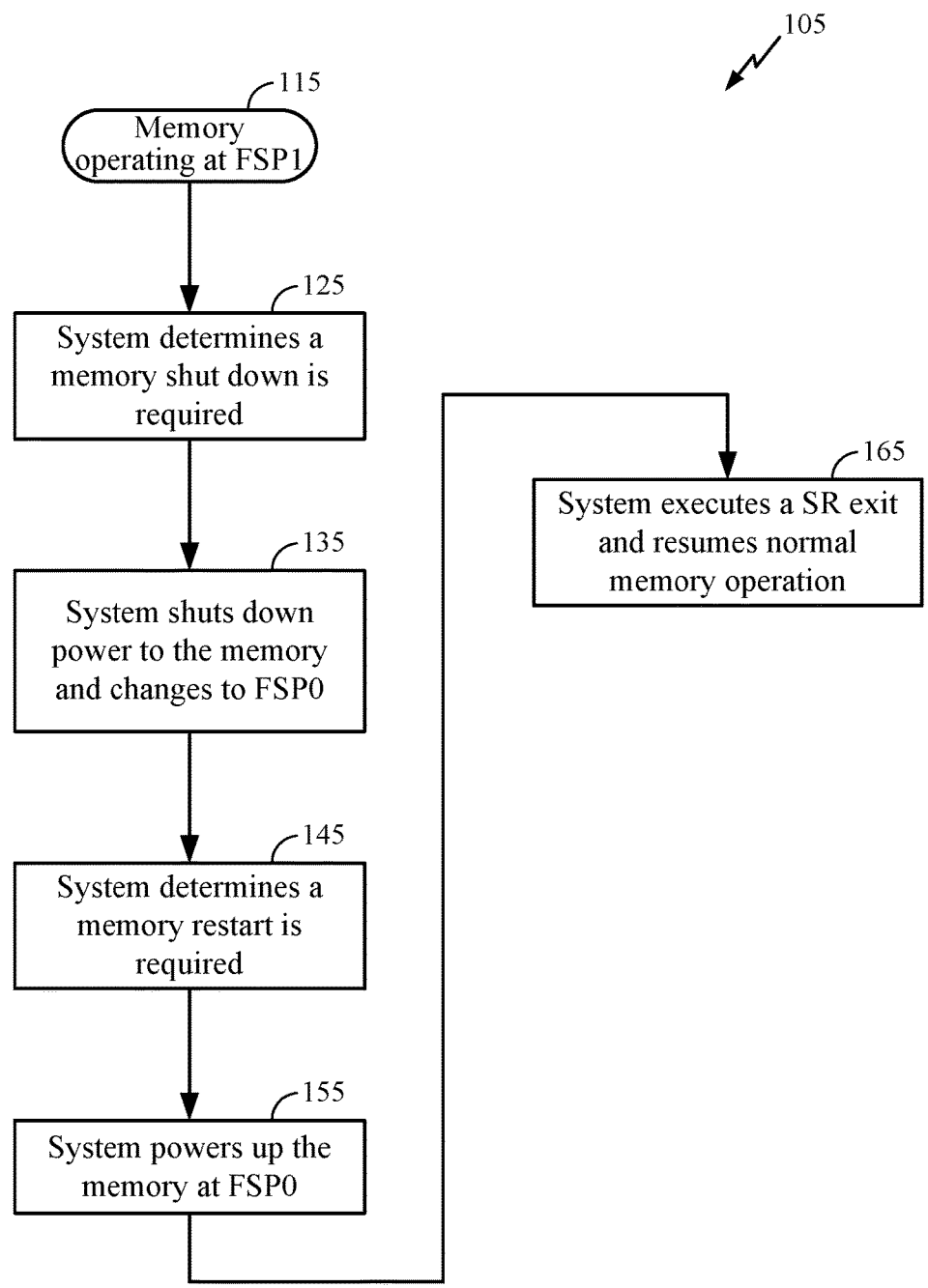
FIG. 1B illustrates an exemplary partial process flow with a power down sequence in accordance with some examples of the disclosure.

FIG. 1B illustrates an exemplary partial process flow for powering down a memory in accordance with some examples of the disclosure. As shown in FIG. 1B, the partial process 105 begins with a system memory (i.e. main memory such as DRAM) and a system processor (i.e. SoC) operating at the first frequency set point, FSP1 (block 115). In block 125, the system processor determines a system memory shut down and system reset is required. In block 135, the system processor sends a power down command to the system memory and changes the system processor to operate at a second frequency set point, FSP0. In block 145, the system processor determines a memory restart of the system memory is required or appropriate. In block 155, the system processor sends a power up command to the system memory to power up at the FSP0. In block 165, the system processor executes a SR exit and resumes normal memory operation since both the system processor and the system memory are both operational at FSP0 and there is no frequency mismatch in the IO communications. While only two FSPs are discussed, it should be understood that more than two FSPs may be used by the system. The determination that a system memory shut down and restart is required may be based on a number of different conditions including a manual reset switch being toggled or a system crash resulting in an automatic system reset occurrence.

FIG. 2 illustrates another exemplary partial process flow for an FSP reset sequence in accordance with some examples of the disclosure. As shown in FIG. 2, the partial process 200 begins in block 210 with the SoC and main memory both operating at the same FSP, which can be FSP0 or FSP1 in this example. However, it should be understood that there may be more than two FSPs for the system. In block 220, an FSP reset condition check may be initiated to check for conditions that may require a system reset. After initiation of the FSP reset condition check, the partial process 200 performs two checks. In block 230, the system checks to see if a number of commands have been received by, for example, using a counter. In block 240, the system checks to see if a number of clock cycles have transpired before a certain event, for example a number of clock cycles have occurred since the SoC has accessed the main memory. In block 250, the system determines if either the check in block 230 or the check in block 240 reveals that the FSP reset condition has been met. If the checks at blocks 230 or 240 reveal that an FSP reset condition has not been met, the partial process 200 returns to block 210. If the checks at blocks 230 or 240 reveal that an FSP reset condition has been met, the partial process 200 moves to block 260. In block 260, an FSP reset sequence is initiated, for example, the FSP reset sequence described with regard to FIG. 1. In block 270, the system may return to idle (or normal operation) after the FSP reset sequence.

Figure 3A:
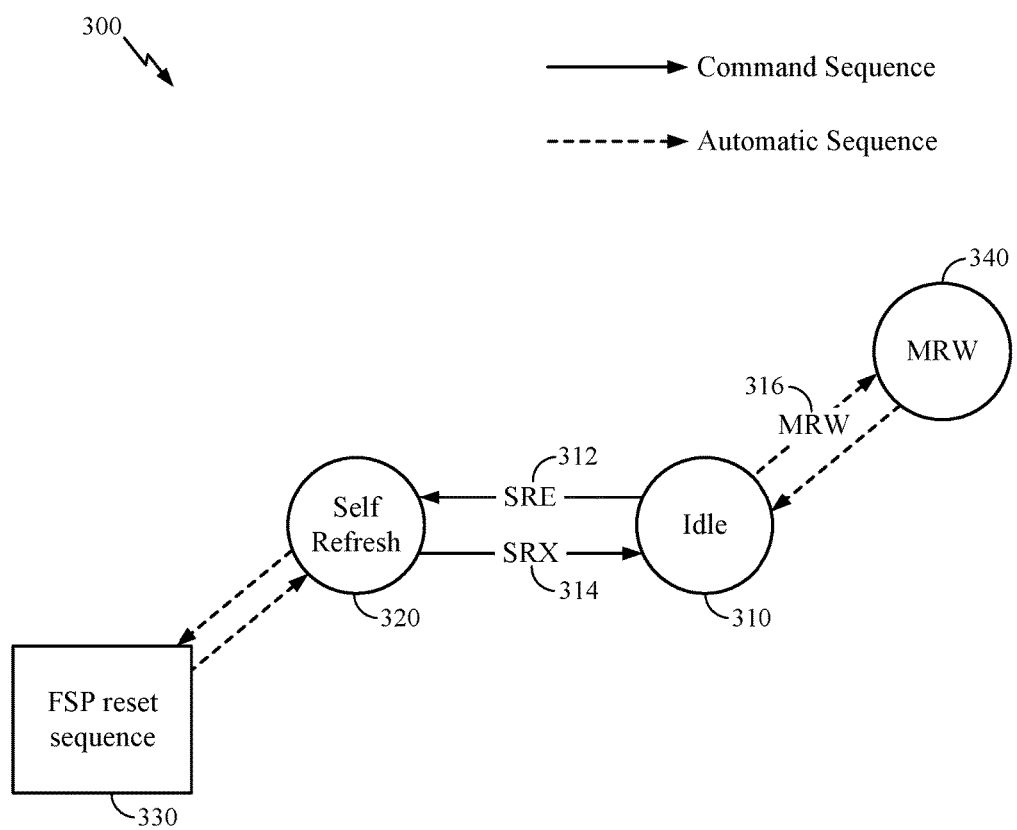
FIG. 3A illustrates an exemplary state diagram for a FSP reset sequence in accordance with some examples of the disclosure.

FIG. 3A illustrates an exemplary state diagram 300 for an FSP reset sequence in accordance with some examples of the disclosure. As shown in FIG. 3A, the system may begin in an idle state 310. While in the idle state 310, an FSP reset condition may occur that causes a self-refresh entry command 312 (i.e. SRE) to be issued. The system then enters a self-refresh state 320. After entry of the self-refresh state 320, the system may perform an automatic FSP reset sequence 330 (see for example FIGS. 1A, 1B, 2 and 3B). Once the automatic FSP reset sequence 330 is concluded, the self-refresh state 320 may issue a self-refresh exit command 314 (i.e. SRX) and then system will return to the idle state 310. This may be followed by a mode register write command 316 (i.e. MRW) being issued. When the mode register write command 316 is issued, the system moves to a mode register write state 340. During the mode register write state 340, the system may transfer the crash logs in the system cache memory to the system main memory. After which, the system returns to the idle state 310.

Figure 3B:
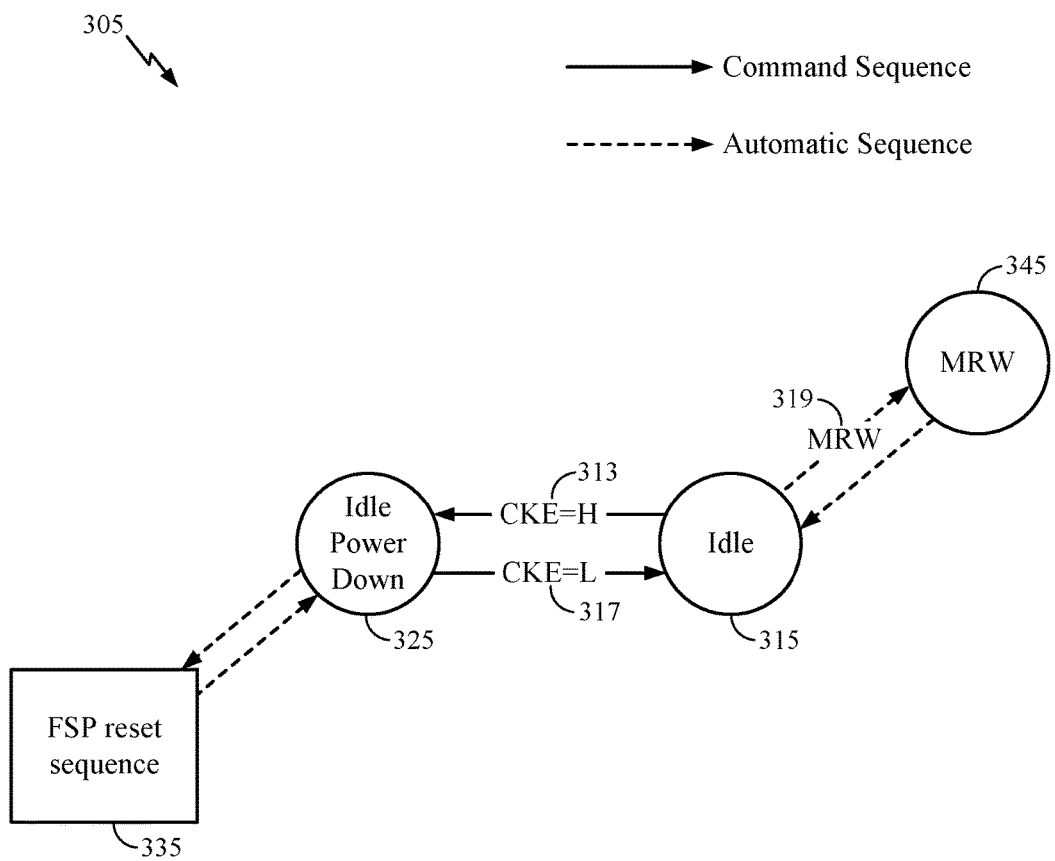
FIG. 3B illustrates an exemplary state diagram for a power down sequence in accordance with some examples of the disclosure.

FIG. 3B illustrates an exemplary state diagram 305 for a power down sequence in accordance with some examples of the disclosure. As shown in FIG. 3B, the system may begin in an idle state 315. While in the idle state 315, a power down condition may occur that causes a power down command 313 (i.e. CKE=H) to be issued. The system then enters a power down state 325. After entry of the power down state 325, the system may perform an automatic FSP reset sequence 335 (see for example FIGS. 1A, 1B, 2 and 3A). Once the automatic FSP reset sequence 335 is concluded, the power down state 325 may issue a power down exit command 317 (i.e. CKE=L) and then the system will return to the idle state 315. This may be followed by a mode register write command 319 (i.e. MRW) being issued. When the mode register write command 319 is issued, the system moves to a mode register write state 345. During the mode register write state 345, the system may transfer the crash logs in the system cache memory to the system main memory. After which, the system returns to the idle state 315.

FIG. 4 illustrates exemplary mode register entries in accordance with some examples of the disclosure. As shown in FIG. 4, a mode register write command 410 may include a number of entries such as an FSP reset condition count 412, an FSP reset condition 414, an FSP write reset value 416, an FSP operation reset value 418, and an FSP reset entry 420. While five entries are shown in this example, it should be understood that more or less than five entries may be used. The FSP reset condition count 412 may utilize operand 4-7 (OP[4:7]) that includes data for a valid command or clock cycle counting depending on the condition of operand 3 (OP[3]). The FSP reset condition 414 may utilize operand 3 (OP[3]) that includes data indicating the reset conditions as a certain number of valid commands after a mode register write command before FSP reset (OP[3]=0) or a certain number of clock cycles after mode register write command before FSP reset (OP[3]=1). The FSP write reset value 416 may utilize operand 2 (OP[2]) that includes data indicating the FSP write reset to zero when reset conditions are met (OP[2]=0) or FSP write reset to one when reset conditions are met (OP[2]=1). The FSP operation reset value 418 may utilize operand 1 (OP[1]) that includes data indicating the FSP reset to zero when reset conditions are met (OP[1]=0) or FSP reset to one when reset conditions are met (OP[1]=1). The FSP reset entry 420 may utilize operand 0 (OP[0]) that includes data indicating no FSP reset when reset conditions are not met (OP[0]=0) or FSP reset when reset conditions are met (OP[0]=1).

In this description, certain terminology is used to describe certain features. The term "mobile device" can describe, and is not limited to, a music player, a video player, an entertainment unit, a navigation device, a communications device, a mobile device, a mobile phone, a smartphone, a personal digital assistant, a fixed location terminal, a tablet computer, a computer, a wearable device, a laptop computer, a server, an automotive device in an automotive vehicle, and/or other types of portable electronic devices typically carried by a person and/or having communication capabilities (e.g., wireless, cellular, infrared, short-range radio, etc.). Further, the terms "user equipment" (UE), "mobile terminal," "mobile device," and "wireless device," can be interchangeable.

Figure 5:
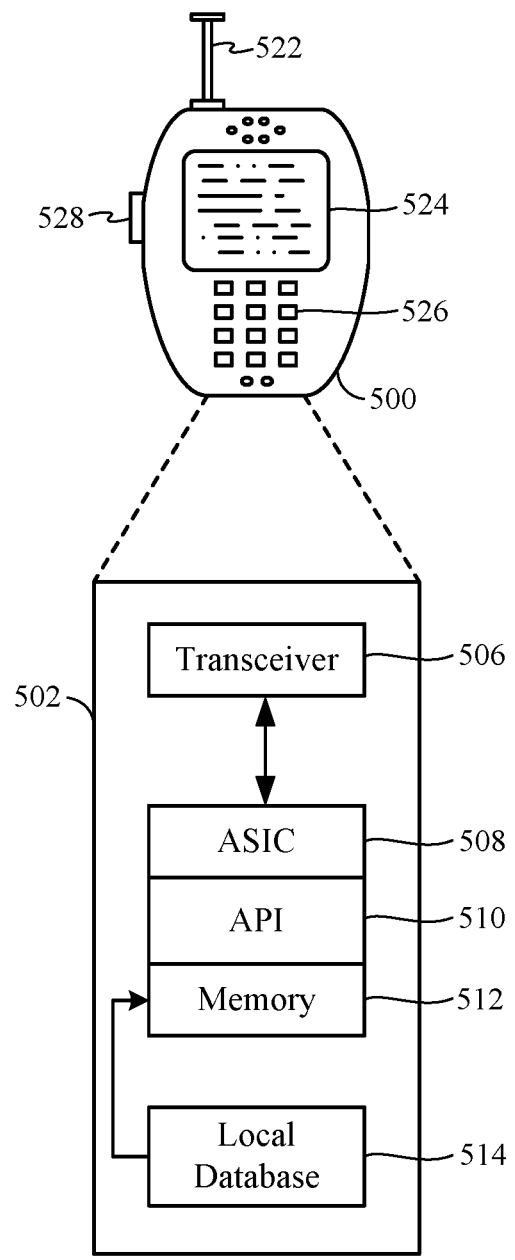
FIG. 5 illustrates exemplary user equipment (UE) in accordance with some examples of the disclosure.

Processes, states and commands according to the examples above (e.g. process 100, process 105, process 200, the state diagram 300, the state diagram 305 and the mode register write command 410) can be used for a number of different applications, such as in the circuit components of a mobile device. Referring to FIG. 5 as an example, an UE 500, (here a wireless device), which has a platform 502 that can receive and execute software applications, data and/or commands transmitted from a radio access network (RAN) that may ultimately come from a core network, the Internet and/or other remote servers and networks. Platform 502 can include a transceiver 506 operably coupled to an application specific integrated circuit ("ASIC" 508), or other processor, microprocessor, logic circuit, or other data processing device such as a SoC. ASIC 508 or other processor executes an application programming interface ("API") 510 layer that interfaces with any resident programs in memory 512 (i.e. the main memory described above) of the wireless device. Memory 512 can be comprised of random-access memory (DRAM) or any similar memory common to computer platforms. Platform 502 also can include a local database 514 that can hold applications not actively used in memory 512. Local database 514 is typically a flash memory cell, but can be any secondary storage device as known in the art, such as magnetic media, EEPROM, optical media, tape, soft or hard disk, or the like. Internal components of the platform 502 can also be operably coupled to external devices such as an antenna 522, a display 524, a push-to-talk button 528 and a keypad 526 among other components, as is known in the art.

The wireless communication between UE 500 and the RAN can be based on different technologies, such as code division multiple access (CDMA), W-CDMA, time division multiple access (TDMA), frequency division multiple access (FDMA), Orthogonal Frequency Division Multiplexing (OFDM), Global System for Mobile Communications (GSM), 3GPP Long Term Evolution (LTE) or other protocols that may be used in a wireless communications network or a data communications network.

Figure 6:
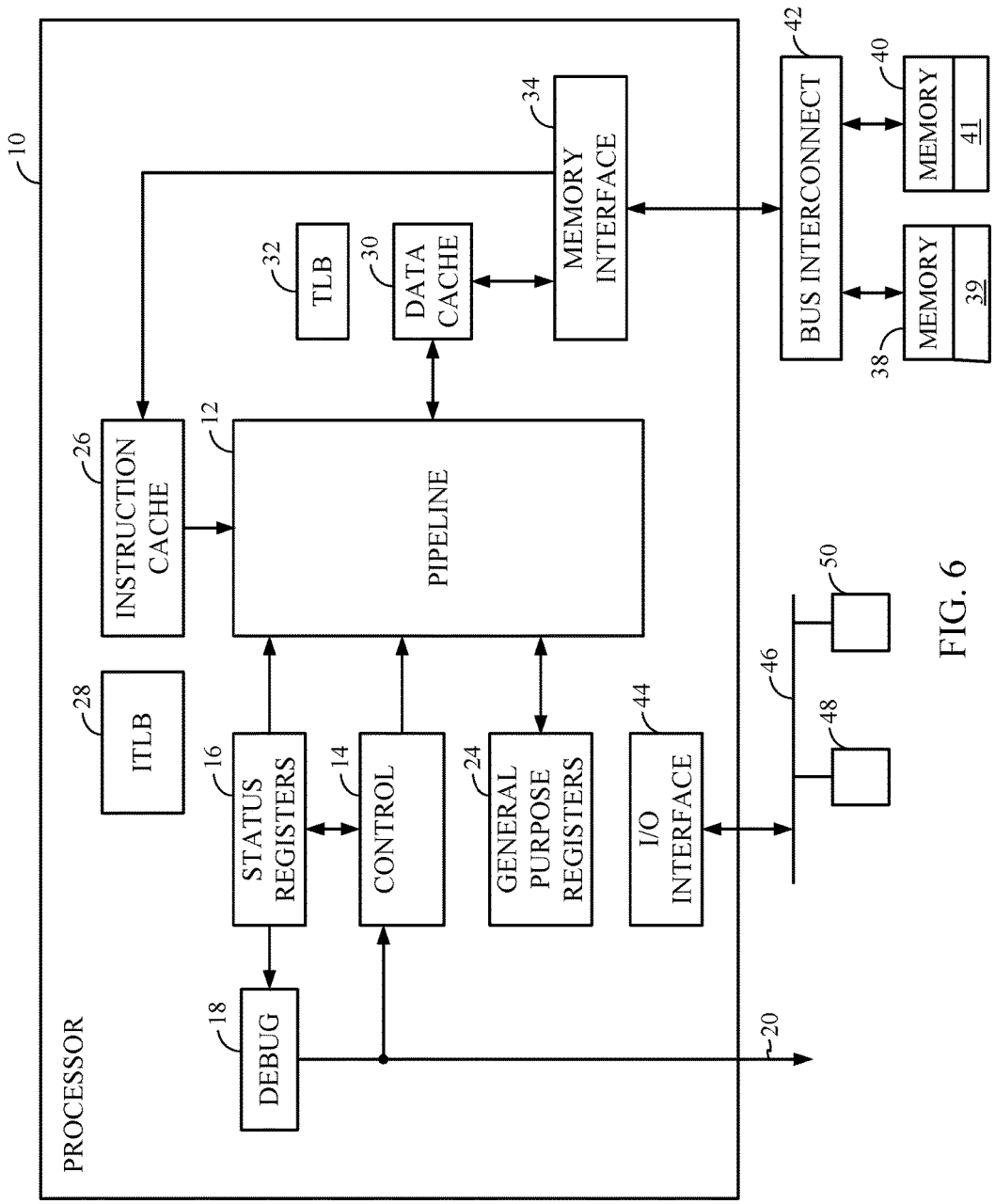
FIG. 6 illustrates an exemplary processor in accordance with some examples of the disclosure.

FIG. 6 depicts a functional block diagram of an exemplary processor 10, such as an ASIC 508 or the SoC described above. Processor 10 executes instructions in an instruction execution pipeline 12 according to control logic 14. Control logic 14 sets and clears bits in one or more status registers 16 to indicate, e.g., the current instruction set operating mode, information regarding the results of arithmetic operations and logical comparisons (zero, carry, equal, not equal), and the like. In some examples, the instruction execution pipeline 12 may be a superscalar design, with multiple, parallel pipelines. The instruction execution pipeline 12 may also be referred to as an execution unit. A General Purpose Register (GPR) file 20 provides a list of general purpose registers 24 accessible by pipeline 12, and comprising the top of the memory hierarchy. One of the general purpose registers 24 may be configured as a clock cycle counter to count a number of clock cycles since the last reset command was received by the memory and another one of the general purpose registers 24 may be configured as a processor command counter to count a number of processor commands received by the memory since a last reset command. For example, if it is determined that the number of processor commands exceeds a command reset value or if the number of clock cycles exceeds a clock reset value, the processor 10 may issue a new reset command. The clock counter and the processor command counter may also be a different register or memory component such as data cache (D-cache) 30.

Processor 10, which executes instructions from at least two instruction sets in different instruction set operating modes, additionally includes a debug circuit 18, operative to compare, upon the execution of each instruction, at least a predetermined target instruction set operating mode to the current instruction set operating mode, and to provide an indication of a match between the two as described in the examples of FIGS. 1A-5 above.

Pipeline 12 fetches instructions from an instruction cache (I-cache) 26, with memory address translation and permissions managed by an Instruction-side Translation Lookaside Buffer (ITLB) 28. Data is accessed from D-cache 30 (such as may temporarily store crash logs), with memory address translation and permissions managed by a main Translation Lookaside Buffer (TLB) 32. In various examples, ITLB 28 may comprise a copy of part of TLB 32. Alternatively, ITLB 28 and TLB 32 may be integrated. Similarly, in various examples of processor 10, I-cache 26 and D-cache 30 may be integrated, or unified. Further, I-cache 26 and D-cache 30 may be L1 caches. Misses in I-cache 26 and/or D-cache 30 cause an access to main (off-chip) memory 38, 40 by a memory interface 34. Main memory 38 may include a first mode register 39 configurable to store a current FSP for the main memory 38 and main memory 40 may also include a second mode register 41 configurable to store a current FSP for the main memory 40. Memory interface 34 may be a master input to a bus interconnect 42 implementing a shared bus to one or more main memories 38, 40 that may incorporate the improved FSP processes in accordance with some examples of the disclosure. Additional master devices (not shown) may additionally connect to bus interconnect 42.

Processor 10 may include input/output (I/O) interface 44, which may be a master device on a peripheral bus, across which I/O interface 44 may access various peripheral devices 48, 50 via bus 46. Those of skill in the art will recognize that numerous variations of processor 10 are possible. For example, processor 10 may include a second-level (L2) cache for either or both I and D caches 26, 30. In addition, one or more of the functional blocks depicted in processor 10 may be omitted from a particular example. Other functional blocks that may reside in processor 10, such as a JTAG controller, instruction pre-decoder, branch target address cache, and the like are not germane to a description of the present disclosure, and are omitted for clarity.

The word "exemplary" is used herein to mean "serving as an example, instance, or illustration." Any details described herein as "exemplary" is not necessarily to be construed as preferred or advantageous over other examples. Likewise, the term "examples" does not require that all examples include the discussed feature, advantage or mode of operation. Use of the terms "in one example," "an example," "in one feature," and/or "a feature" in this specification does not necessarily refer to the same feature and/or example. Furthermore, a particular feature and/or structure can be combined with one or more other features and/or structures. Moreover, at least a portion of the apparatus described hereby can be configured to perform at least a portion of a method described hereby.

The terminology used herein is for the purpose of describing particular examples only and is not intended to be limiting of examples of the disclosure. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should be noted that the terms "connected," "coupled," or any variant thereof, mean any connection or coupling, either direct or indirect, between elements, and can encompass a presence of an intermediate element between two elements that are "connected" or "coupled" together via the intermediate element.

Any reference herein to an element using a designation such as "first," "second," and so forth does not limit the quantity and/or order of those elements. Rather, these designations are used as a convenient method of distinguishing between two or more elements and/or instances of an element. Thus, a reference to first and second elements does not mean that only two elements can be employed, or that the first element must necessarily precede the second element. Also, unless stated otherwise, a set of elements can comprise one or more elements.

Further, many examples are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer-readable storage medium (e.g. non-transitory) having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the examples described herein, the corresponding form of any such examples may be described herein as, for example, "logic configured to" perform the described action.

Nothing stated or illustrated depicted in this application is intended to dedicate any component, step, feature, benefit, advantage, or equivalent to the public, regardless of whether the component, step, feature, benefit, advantage, or the equivalent is recited in the claims.

Further, those of skill in the art will appreciate that the various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

Although some aspects have been described in connection with a device, it goes without saying that these aspects also constitute a description of the corresponding method, and so a block or a component of a device should also be understood as a corresponding method step or as a feature of a method step. Analogously thereto, aspects described in connection with or as a method step also constitute a description of a corresponding block or detail or feature of a corresponding device. Some or all of the method steps can be performed by a hardware apparatus (or using a hardware apparatus), such as, for example, a microprocessor, a programmable computer or an electronic circuit. In some examples, some or a plurality of the most important method steps can be performed by such an apparatus.

In the detailed description above it can be seen that different features are grouped together in examples. This manner of disclosure should not be understood as an intention that the claimed examples require more features than are explicitly mentioned in the respective claim. Rather, the situation is such that inventive content may reside in fewer than all features of an individual example disclosed. Therefore, the following claims should hereby be deemed to be incorporated in the description, wherein each claim by itself can stand as a separate example. Although each claim by itself can stand as a separate example, it should be noted that-although a dependent claim can refer in the claims to a specific combination with one or a plurality of claims-other examples can also encompass or include a combination of said dependent claim with the subject matter of any other dependent claim or a combination of any feature with other dependent and independent claims. Such combinations are proposed herein, unless it is explicitly expressed that a specific combination is not intended. Furthermore, it is also intended that features of a claim can be included in any other independent claim, even if said claim is not directly dependent on the independent claim.

It should furthermore be noted that methods disclosed in the description or in the claims can be implemented by a device comprising means for performing the respective steps or actions of this method.

Furthermore, in some examples, an individual step/action can be subdivided into a plurality of sub-steps or contain a plurality of sub-steps. Such sub-steps can be contained in the disclosure of the individual step and be part of the disclosure of the individual step.

While the foregoing disclosure shows illustrative examples of the disclosure, it should be noted that various changes and modifications could be made herein without departing from the scope of the disclosure as defined by the appended claims. The functions, steps and/or actions of the method claims in accordance with the examples of the disclosure described herein need not be performed in any particular order. Additionally, well-known elements will not be described in detail or may be omitted so as to not obscure the relevant details of the aspects and examples disclosed herein. Furthermore, although elements of the disclosure may be described or claimed in the singular, the plural is contemplated unless limitation to the singular is explicitly stated.

What is claimed is:

1. A method for frequency reset of a first memory, the method comprising:
    setting a register entry, the register entry comprises data indicating a reset condition and a second frequency set point;
    initiating, by a processor, a reset condition check when the processor is operating at a first frequency set point and the first memory is operating at the first frequency set point;
    counting a number of processor commands received by the first memory since a last reset command;
    counting a number of clock cycles since the last reset command was received by the first memory;
    determining if the number of processor commands exceeds a command reset value;
    determining if the number of clock cycles exceeds a clock reset value;
    if the number of processor commands exceeds the command reset value or if the number of clock cycles exceeds the clock reset value, issuing, by the processor, a reset command comprising:
    issuing, by the processor, a self-refresh command to the first memory, the self-refresh command including a frequency reset entry;
    storing a crash log in a second memory in response to the self-refresh command, the second memory is a cache memory of the processor different from the first memory;
    setting the processor at the second frequency set point;
    issuing, by the processor, a register write command to set the first memory at the second frequency set point, the register write command comprises the register entry; and
    setting the first memory at the second frequency set point.

2. The method for frequency reset of claim 1, further comprising storing the crash log in the second memory before setting the processor at the second frequency set point.

3. The method for frequency reset of claim 2, further comprising storing the crash log in the first memory after setting the first memory at the second frequency set point.

4. The method for frequency reset of claim 1, wherein the first memory is incorporated into a device selected from a group comprising of a music player, a video player, an entertainment unit, a navigation device, a communications device, a mobile device, a mobile phone, a smartphone, a personal digital assistant, a fixed location terminal, a tablet computer, a computer, a wearable device, a laptop computer, a server, and an automotive device in an automotive vehicle, and further includes the device.

5. A non-transient computer-readable medium containing program instructions for causing a processor to perform a process comprising:
    setting a register entry, the register entry comprises data indicating a reset condition and a second frequency set point;
    initiating, by a processor, a reset condition check when the processor is operating at a first frequency set point and the first memory is operating at the first frequency set point;
    counting a number of processor commands received by the first memory since a last reset command;
    counting a number of clock cycles since the last reset command was received by the first memory;
    determining if the number of processor commands exceeds a command reset value;
    determining if the number of clock cycles exceeds a clock reset value;
    if the number of processor commands exceeds the command reset value or if the number of clock cycles exceeds the clock reset value, issuing, by the processor, a reset command comprising:
    issuing a self-refresh command to the first memory, the self-refresh command including a frequency reset entry;
    storing a crash log in a second memory in response to the self-refresh command, the second memory is a cache memory of the processor different from the first memory;
    setting the processor at the second frequency set point;
    issuing a register write command to set the first memory at the second frequency set point, the register write command comprises the register entry; and
    setting the first memory at the second frequency set point.

6. The non-transient computer-readable medium of claim 5, further comprising storing the crash log in the second memory before setting the processor at the second frequency set point.

7. The non-transient computer-readable medium of claim 6, further comprising storing the crash log in the first memory after setting the first memory at the second frequency set point.

8. A method for checking reset conditions of a first memory, the method comprising:
    initiating, by a processor, a reset condition check when the processor is operating at a first frequency set point and the first memory is operating at the first frequency set point;
    counting a number of processor commands received by the first memory since a last reset command;
    counting a number of clock cycles since the last reset command was received by the first memory;
    determining if the number of processor commands exceeds a command reset value;
    determining if the number of clock cycles exceeds a clock reset value;
    if the number of processor commands exceeds the command reset value or if the number of clock cycles exceeds the clock reset value, issuing, by the processor, a reset command comprising:
    issuing a self-refresh command to the first memory, the self-refresh command including a frequency reset entry;
    setting the processor at a second frequency set point;

issuing a register write command to set the first memory at the second frequency set point; and setting the first memory at the second frequency set point.

9. The method for checking reset conditions of claim 8, further comprising storing a crash log in a second memory before setting the processor at the second frequency set point.

10. The method for checking reset conditions of claim 9, further comprising storing the crash log in the first memory after setting the first memory at the second frequency set point.

11. The method for checking reset conditions of claim 8, wherein the first memory is incorporated into a device selected from a group comprising of a music player, a video player, an entertainment unit, a navigation device, a communications device, a mobile device, a mobile phone, a smartphone, a personal digital assistant, a fixed location terminal, a tablet computer, a computer, a wearable device, a laptop computer, a server, and an automotive device in an automotive vehicle, and further includes the device.

12. A non-transient computer-readable medium containing program instructions for causing a processor to perform a process comprising:

initiating a reset condition check when the processor is operating at a first frequency set point and a first memory is operating at the first frequency set point;

counting a number of processor commands received by the first memory since a last reset command;

counting a number of clock cycles since the last reset command was received by the first memory;

determining if the number of processor commands exceeds a command reset value;

determining if the number of clock cycles exceeds a clock reset value;

if the number of processor commands exceeds the command reset value or if the number of clock cycles exceeds the clock reset value, issuing a reset command comprising:

issuing a self-refresh command to the first memory, the self-refresh command including a frequency reset entry;

setting the processor at a second frequency set point;

issuing a register write command to set the first memory at the second frequency set point; and setting the first memory at the second frequency set point.

13. The non-transient computer-readable medium of claim 12, further comprising storing a crash log in a second memory before setting the processor at the second frequency set point.

14. The non-transient computer-readable medium of claim 13, further comprising storing the crash log in the first memory after setting the first memory at the second frequency set point.

15. An apparatus for controlling a frequency set point reset of a first memory, the apparatus comprising:

a processor coupled to the first memory and a second memory, the second memory different than the first memory;

the first memory configured to store:

a frequency reset condition count that indicates a frequency reset condition for resetting the first memory;

a frequency reset condition that indicates one of a number of processor commands received by the first memory since a last reset command was received by the first memory or a number of clock cycles that have occurred since the last reset command was received by the first memory;

a frequency write reset value that indicates when the frequency reset condition has been met;

a frequency reset value that indicates a frequency set point for the first memory; and a frequency reset entry that indicates whether the first memory has reset when the frequency reset condition has been met.

16. The apparatus of claim 15, wherein the frequency reset condition count includes a plurality of operand conditions.

17. The apparatus of claim 16, wherein a mode register is incorporated into the first memory.

18. The apparatus of claim 17, wherein the frequency reset condition count is updated by the processor.

19. The apparatus of claim 18, wherein the mode register is connected to the second memory and the second memory is configured to store a crash log.

20. The apparatus of claim 19, wherein the first memory is incorporated into a device selected from a group comprising of a music player, a video player, an entertainment unit, a navigation device, a communications device, a mobile device, a mobile phone, a smartphone, a personal digital assistant, a fixed location terminal, a tablet computer, a computer, a wearable device, a laptop computer, a server, and an automotive device in an automotive vehicle, and further includes the device.

* * * * *